(12) United States Patent
Apelt et al.

(10) Patent No.: US 10,402,900 B2
(45) Date of Patent: Sep. 3, 2019

(54) SYSTEMS AND METHODS FOR PROVIDING A SEPARATE INTEREST RATE FOR AN INDIVIDUAL TRANSACTION

(71) Applicant: Capital One Financial Corporation, McLean, VA (US)

(72) Inventors: Marcie Apelt, Richmond, VA (US); Megan Edds, Glen Allen, VA (US); Keith Barron, Henrico, VA (US); Ashley Gibbs, Richmond, VA (US); Matthew Vischulis, Vienna, VA (US); Carl Ashby, Montpelier, VA (US); Baining Hu, Vienna, VA (US); Yi Liu, Oakton, VA (US); David Schardt, Henrico, VA (US)

(73) Assignee: CAPITAL ONE SERVICES, LLC, McClean, VA (US)

( * ) Notice: Subject to any disclaimer, the term of this patent is extended or adjusted under 35 U.S.C. 154(b) by 706 days.

(21) Appl. No.: 14/847,988

(22) Filed: Sep. 8, 2015

(65) Prior Publication Data

US 2016/0071203 A1     Mar. 10, 2016

Related U.S. Application Data

(60) Provisional application No. 62/048,099, filed on Sep. 9, 2014.

(51) Int. Cl.
   *G06Q 40/00*               (2012.01)
   *G06Q 40/02*               (2012.01)
(52) U.S. Cl.
   CPC .................. *G06Q 40/02* (2013.01)

(58) Field of Classification Search
   CPC ........................................ G06Q 40/02
   USPC ........................................ 705/35–45
   See application file for complete search history.

(56) References Cited

U.S. PATENT DOCUMENTS

| | | | |
|---|---|---|---|
| 7,392,222 B1* | 6/2008 | Hamilton | G06Q 20/10 235/379 |
| 7,406,442 B1* | 7/2008 | Kottmeier, Jr. | G06Q 20/10 705/35 |
| 8,538,872 B1* | 9/2013 | Voutour | G06Q 20/10 705/36 R |
| 2002/0062279 A1* | 5/2002 | Behrenbrinker | G06Q 20/04 705/39 |
| 2003/0041025 A1* | 2/2003 | Bonalle | G06Q 20/10 705/39 |

(Continued)

*Primary Examiner* — Samica L Norman
(74) *Attorney, Agent, or Firm* — Finnegan, Henderson, Farabow, Garrett & Dunner LLP

(57) ABSTRACT

Systems and methods for providing a separate interest rate for an individual transaction are disclosed. A system may provide a service associated with a account having an account balance and an associated first interest rate. The system may include a service device having one or more memory devices storing instructions and one or more processors configured to execute the instructions to perform a separate interest rate service process. The process may include providing a separate interest rate service offer to a client device and receiving a separate interest rate selection from the client device. The process may also include determining a selected portion of the account balance corresponding to an amount to which a second interest rate, different from the first interest rate, is to be applied based on the separate interest rate selection.

19 Claims, 7 Drawing Sheets

(56) References Cited

U.S. PATENT DOCUMENTS

| | | | | |
|---|---|---|---|---|
| 2003/0097270 | A1* | 5/2003 | Musselwhite | G06Q 20/10 705/39 |
| 2005/0097039 | A1* | 5/2005 | Kulcsar | G06Q 20/102 705/40 |
| 2005/0209938 | A1* | 9/2005 | Czyzewski | G06Q 20/227 705/30 |
| 2007/0080212 | A1* | 4/2007 | Rosenblatt | G06Q 40/00 235/380 |
| 2007/0250442 | A1* | 10/2007 | Hogan | G06Q 20/10 705/41 |
| 2008/0228611 | A1* | 9/2008 | Lilly | G06Q 20/10 705/34 |
| 2008/0288396 | A1* | 11/2008 | Siggers | G06Q 20/10 705/39 |
| 2009/0171776 | A1* | 7/2009 | Scipioni | G06Q 20/10 705/14.18 |
| 2011/0208659 | A1* | 8/2011 | Easterly | G06Q 20/027 705/79 |
| 2012/0030099 | A1* | 2/2012 | Marshall | G06Q 20/10 705/40 |
| 2013/0046692 | A1* | 2/2013 | Grigg | G06Q 40/00 705/44 |
| 2013/0173492 | A1* | 7/2013 | Leavenworth | G06Q 30/01 705/347 |
| 2015/0032546 | A1* | 1/2015 | Calman | G06Q 30/0251 705/14.61 |
| 2015/0302411 | A1* | 10/2015 | Bondesen | G06Q 20/20 705/72 |

\* cited by examiner

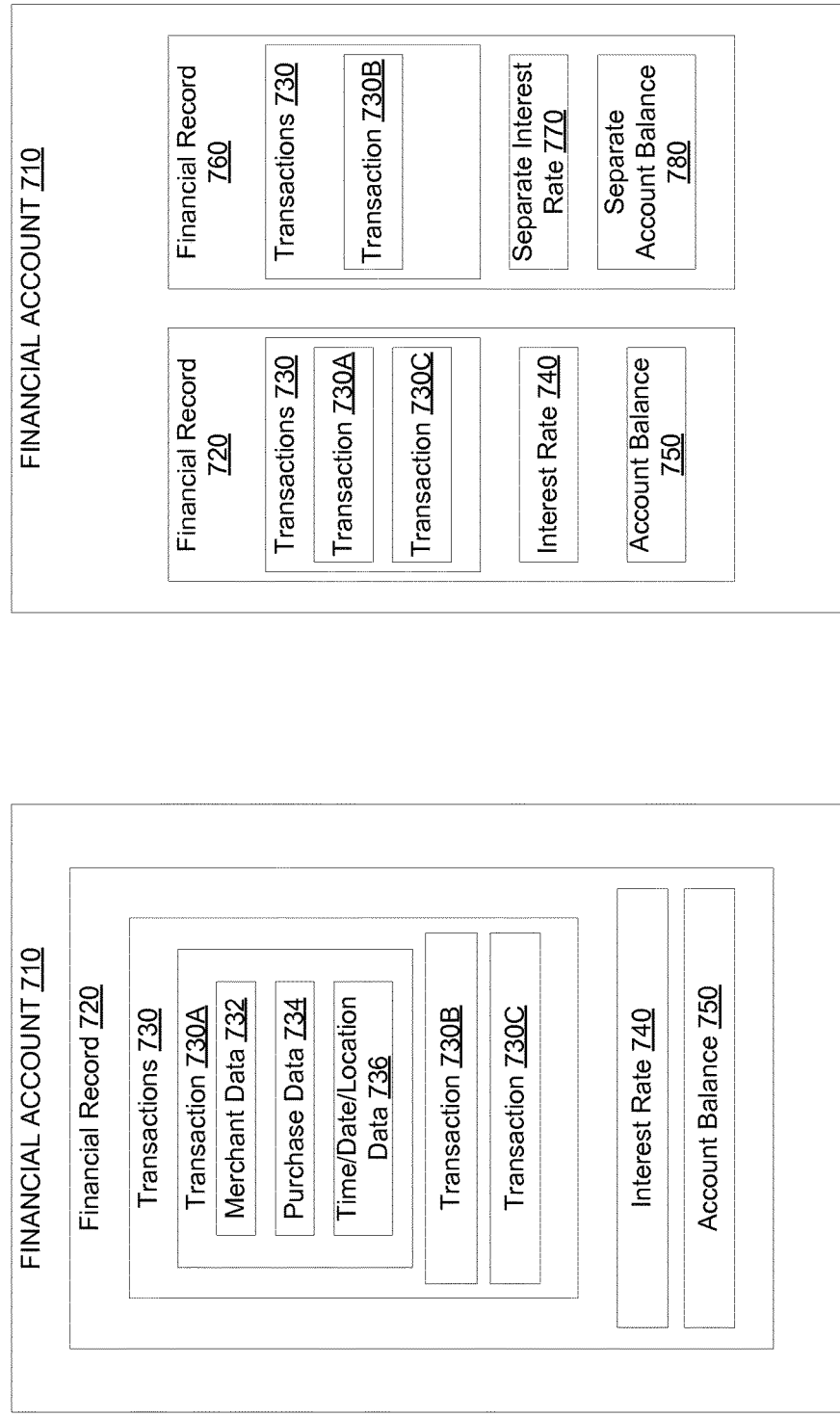

SYSTEMS AND METHODS FOR PROVIDING A SEPARATE INTEREST RATE FOR AN INDIVIDUAL TRANSACTION

PRIORITY CLAIM

This disclosure claims priority under 35 U.S.C. § 119 to U.S. Provisional Patent Application No. 62/048,099 filed on Sep. 9, 2014, and entitled "Systems and Methods for Providing a Separate Interest Rate for an Individual Transaction." The aforementioned application is incorporated herein by reference in its entirety.

TECHNICAL FIELD

The disclosed embodiments generally relate to systems and methods particularly adapted to provide a service based on communication between specifically-configured devices, and more particularly, systems and methods for providing separate interest rates for individual transactions.

BACKGROUND

Financial service providers often provide customers with promotional benefits associated with financial accounts and/or financial account products. For example, a customer that opens a new credit card account may receive a promotional benefit of a low interest rate for a set period of time (e.g., 0% for 12 months). The customer may use the credit card account while the financial service provider maintains a balance of the account by applying the low interest rate until the period of time expires. After the period of time expires, a higher interest rate is typically applied.

While these promotional benefits may be appealing to customers, customers sometimes must complete complicated or impractical tasks to receive them. For example, because promotional benefits may be costly to a financial service provider, they may be less likely to offer them and/or make it harder for customers to obtain the benefits. Further, opening a new financial account can be a complicated process capable of directly and indirectly impacting the customer's financial status (e.g., applying for credit can impact a customer's credit score). Other common scenarios in which a customer may receive a promotional benefit are also unappealing (e.g., receiving a benefit for transferring a balance may have an associated fee).

Current computing systems and supporting infrastructures are ill-equipped to provide timely, customized promotional benefits, such as separate interest rates for individual transactions. Thus, there exists a need for improved systems and methods for providing promotional benefits associated with a financial account to a customer.

SUMMARY

The disclosed embodiments include systems and methods that enable a service provider to offer a customer a separate interest rate for an individual transaction and provide the customer with a service that includes maintaining separate balances within one account to apply the separate interest rate.

In one aspect, the present disclosure is directed to a system for providing a service associated with an account having an account balance and an associated first interest rate. The system may include a service device configured to modify the account based on communication with a client device. The service device may include one or more memory devices storing instructions, and one or more processors configured to execute the instructions to provide a separate interest rate service offer to a client device, and receive a separate interest rate selection from the client device. The one or more processors may be further configured to execute the instructions to determine, by the one or more processors, a selected portion of the account balance corresponding to an amount to which a second interest rate, different from the first interest rate, is to be applied based on the separate interest rate selection.

In another aspect, the present disclosure is directed to a computer-implemented method for providing a financial service associated with a financial account having an account balance and an associated first interest rate. The process may include providing, by a service device, a separate interest rate service offer to a client device, and receiving, at the service device, a customer-selected transaction from the client device. The process may also include determining, by the service device, a selected portion of the account balance based on an amount of the customer-selected transaction, wherein a remainder portion of the account balance is a first balance and the selected portion is a second balance. The process may further include applying the first interest rate to the first balance, and applying a second interest rate to the second balance.

In yet another aspect, the present disclosure is directed to a computing device for configuring a financial account having an account balance and an associated first interest rate. The computing device may include one or more memory devices storing software instructions and a user interface. The computing device may also include one or more processors configured to execute the software instructions to provide, by the user interface, financial account information including a plurality of transactions, and receive a selection of one of the plurality of transactions. The one or more processors may be further configured to execute the software instructions to transmit the selection to a financial service provider device. The selection may indicate an amount to which a second interest rate, different from the first interest rate, is to be applied by a financial service provider device.

Although disclosed embodiments are discussed primarily in the context of mobile devices and software instructions that are executed by those mobile devices, other implementations are contemplated. For example, disclosed embodiments may include software instructions that are executed by a computing system, such as embedded systems or other dedicated hardware computing devices configured to perform disclosed embodiments. Thus, systems or components that execute software instructions to perform one or more operations consistent with the disclosed embodiments may be particularly configured to perform the one or more particular operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 7A is block diagram of an exemplary data structure associated with a financial account before a separate interest rate service offer is activated, consistent with disclosed embodiments; and FIG. 7B is an exemplary data structure associated with a financial account after a separate interest rate service offer is activated, consistent with disclosed embodiments.

DETAILED DESCRIPTION

Figure 1:
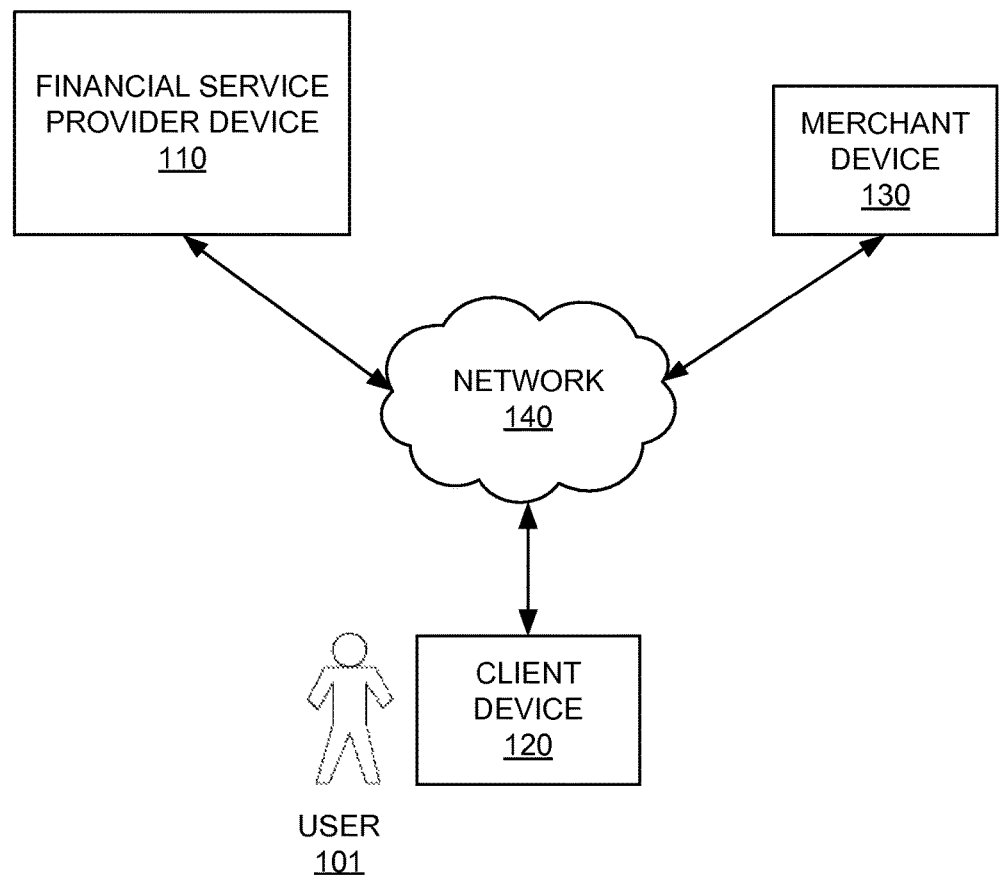
FIG. 1 is a block diagram of an exemplary system, consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

Typically, all purchases that are made using a credit-type financial account (e.g., a credit card account) are added to an account balance. Periodically, an amount of interest to be charged to the customer in connection with the credit provided may be calculated based on an account balance at the time and an interest rate associated with the financial account. Disclosed embodiments include systems and methods that allow there to be separate balances on one financial account for the purposes of applying separate interest rates to the separate balances. For example, in one embodiment, a first interest rate may be applied to an amount associated with one or more individual transactions, while a second interest rate may be applied to an amount associated with the remainder of the total account balance. In this way, a separate interest rate (e.g., a promotional interest rate that is favorable to the customer) may be applied to an individual transaction, potentially reducing a total interest amount that a customer may otherwise be charged and otherwise providing the customer with greater flexibility to use one financial account for many different purchases.

In addition, disclosed embodiments allow a financial service provider to provide an offer for a separate interest rate service to a customer. For example, a financial service provider may offer customers the option to apply an interest rate that is lower than the interest rate otherwise associated with the customer's financial account to an amount associated with a selected individual transaction. In one embodiment, the customer may activate the offer (e.g., via a client device) by selecting an individual transaction (e.g., a previously-completed transaction) for application of the separate interest rate service. In some embodiments, the customer may select a future transaction for which the offer will automatically be activated after the selected future transaction is completed. For example, the customer may select the next transaction that they complete or the next transaction that meets certain criteria (e.g., next transaction at a particular merchant).

In another example, the customer selection may include acceptance of an offer that provides criteria for eligible transactions. For example, an offer may indicate that all transactions at a particular merchant are eligible for the separate interest rate, and the customer may provide a selection that accepts the offer. Thereafter, the financial service provider may determine that a customer completed a transaction at the particular merchant, and take steps to apply the separate interest rate to that transaction (or a group of transactions completed with that merchant).

In another embodiment, the customer may select to activate an offer in the process of completing a transaction. For example, a financial service provider may provide an offer as a step during an online checkout process, which the customer may choose to accept and have applied to the transaction that is completed online.

After a customer accepts a separate interest rate offer, a financial service provider (e.g., via a financial service provider device) may generate data structures for separating a balance associated with a selected individual transaction from a remainder of the account balance for the purposes of applying interest rate charges. The financial service provider may further maintain the data structures separating the balances such that separate interest rates are applied at the appropriate time to the separate balances in order to calculate interest charged to the customer. In some instances, the separate interest rate may expire, and the financial service provider may combine the separate balances into one balance with one associated interest rate.

FIG. 1 is a diagram illustrating an exemplary system 100 for performing one or more operations consistent with the disclosed embodiments. In one embodiment, system 100 may include a financial service provider device 110, client device 120, merchant device 130, and network 140. The components and arrangement of the components included in system 100 may vary. Thus, system 100 may further include other components that perform or assist in the performance of one or more processes consistent with the disclosed embodiments.

Financial service provider device 110 may be associated with an entity that provides financial services. For example, financial service provider device 110 may be associated with a bank, credit card issuer, or other type of financial service provider that offers, issues, generates, provides, manages, and/or maintains financial service accounts for one or more users. Financial service accounts may include, for example, credit card accounts, checking accounts, savings accounts, reward accounts, loan accounts (e.g., general purpose credit, such as an unsecured loan, and/or specific credit, such a loan associated with an automobile, home improvement, mortgage, etc.), and any other types of financial service account known to those skilled in the art.

Financial service accounts may be associated with electronic accounts, such as an account that may be used to perform electronic transactions, including purchasing goods and/or services online. Financial service accounts may also be associated with one or more financial account products, such as a digital wallet or physical financial service account card that a user may carry on their person and use to perform financial service transactions, such as purchasing goods and/or services at a point of sale (POS) terminal. For example, a financial account product may include electronic type of account products, such as a contactless payment device/card or other type of product that may be configured to work with a computing system (e.g., payment terminal, mobile device, etc.) to conduct financial transactions. Financial service provider device 110 may include infrastructure and components that are configured to generate and provide financial service accounts and financial account products (e.g., physical credit cards, check cards, mini cards, digital wallet accounts, etc.). Moreover, as explained, the disclosed embodiments are not limited to financial service accounts or financial service providers. That is, financial service provider device 110 may, where other types of accounts or products are implemented, be associated with an entity that provides those other types of accounts or products configured, activated, and/or controlled in a manner consistent with the disclosed embodiments. One of ordinary skill in the art would understand that in such implementations, the operations of financial service provider device 110 (and its components) as described herein may vary based on the type of entity and the type of accounts or products implemented by the disclosed embodiments.

In one embodiment, financial service provider device 110 may include one or more computing systems that are configured to execute software instructions stored on one or more memory devices to perform one or more operations consistent with the disclosed embodiments. For example, financial service provider device 110 may be configured to execute instructions to perform a financial account management process, including applying separate interest rates to separate account balances within one financial account.

Financial service provider device 110 may include one or more memory device(s) storing data and software instructions and one or more processor(s) configured to use the data and execute the software instructions to perform server-based functions and operations known to those skilled in the art and related to the function and operations of the type of businesses performed by an associated financial service provider (or other type of entity financial service provider device 110 may represent). Moreover, in certain embodiments, financial service provider device 110 may be configured to execute software instructions that interact with software program(s) stored and executed by client device 120, such as a mobile application that is executed on a mobile device.

Financial service provider device 110 may be configured as a particular apparatus, system, and the like based on the storage, execution, and/or implementation of the software instructions that perform one or more operations consistent with the disclosed embodiments. Financial service provider device 110 may be standalone, or it may be part of a subsystem, which may be part of a larger system. For example, financial service provider device 110 may represent distributed servers that are remotely located and communicate over a network (e.g., network 140) or a dedicated network, such as a LAN, for an associated financial service provider.

Financial service provider device 110 may include or may connect to one or more storage devices configured to store data and/or software instructions used by one or more processors of financial service provider device 110 to perform operations consistent with disclosed embodiments. For example, financial service provider device 110 may include memory configured to store one or more software programs that performs several functions when executed by a processor(s). The disclosed embodiments are not limited to separate programs or computers configured to perform dedicated tasks. For example, financial service provider device 110 may include memory that stores a single program or multiple programs. Additionally, financial service provider device 110 may execute one or more programs located remotely from financial service provider device 110. For example, financial service provider device 110 may access one or more remote programs stored in memory included with a remote component that, when executed, perform operations consistent with the disclosed embodiments. In certain aspects, financial service provider device 110 may include web server software that generates, maintains, and provides web site(s) that are accessible over network financial service provider device 110. In other aspects, an associated financial service provider may connect separate web server(s) or similar computing devices that generate, maintain, and provide web site(s) for financial service provider device 110.

Client device 120 may be one or more computing devices that are configured to execute software instructions for performing one or more operations consistent with the disclosed embodiments. Client device 120 may include one or more processors configured to execute software instructions stored in memory, such as memory included in client device 120. Client device 120 may also include software that when executed by one or more processors performs known Internet-related communications and content display processes. For instance, client device 120 may execute browser software that generates and displays interfaces including content on a display device included in, or connected to, client device 120. The disclosed embodiments are not limited to any particular configuration of client device 120. For instance, client device 120 may be a mobile device that stores and executes mobile applications that provide financial service related functions offered by financial service provider device 110 and/or merchant device 130, such as a mobile banking application for controlling, configuring, and viewing information relating to financial accounts, etc. In certain embodiments, client device 120 may be configured as a particular apparatus, system, and the like based on the storage, execution, and/or implementation of the software instructions that perform one or more operations consistent with the disclosed embodiments.

In one embodiment, a user 101 may operate client device 120. In one aspect, user 101 may be a customer or a potential customer of financial service provider device 110. For instance, a financial service provider associated with financial service provider device 110 may generate and maintain a financial service account (e.g., credit card account, a line of credit, etc.) for user 101 such that user 101 may use the account to purchase goods and/or services online or at brick and mortar locations associated with a merchant, such as a merchant associated with merchant device 130. In other embodiments, user 101 may be a potential customer of a financial service provider associated with financial service provider device 110 or may not be affiliated with the financial service provider from the user's perspective and/or the financial service provider's perspective.

Merchant device 130 may be associated with an entity that provides goods and/or services for purchase by consumers (e.g., individuals, businesses, etc.). While FIG. 1 shows one merchant device 130, in system 100, the disclosed embodiments may be implemented in a system involving multiple and different merchants (e.g., a restaurant merchant, a grocery store merchant, a retail store merchant, etc.) and associated merchant devices. A merchant associated with merchant device 130 may include brick and mortar location(s) that a consumer (e.g., user 101) may physically visit and purchase goods and services. Such physical locations may include computing devices that perform financial service transactions with consumers (e.g., POS terminal(s), kiosks, etc.). They may also include back and/or front-end computing components that store data and execute software instructions to perform operations consistent with disclosed embodiments, such as computers that are operated by employees of a merchant associated with merchant device 130 (e.g., back office systems, etc.). In certain embodiments, a merchant associated with merchant device 130 may be one or more merchants that provide electronic shopping mechanisms, such as a website or similar online location that consumers may access using a computer (e.g., client device 120) through browser software or similar software.

In one embodiment, merchant device 130 may be one or more computing devices configured to execute software instructions stored in memory to perform one or more processes consistent with the disclosed embodiments. For example, merchant device 130 may include one or more memory device(s) storing data and software instructions and one or more processor(s) configured to use the data and execute the software instructions to perform server-based functions and operations known to those skilled in the art. Merchant device 130 (or a system including merchant device 130) may be configured as a particular apparatus, system, and the like based on the storage, execution, and/or implementation of the software instructions that perform one or more operations consistent with the disclosed embodiments. Merchant device 130 may be standalone, or it may be part of a subsystem, which may be part of a larger system. For example, merchant device 130 may represent distributed servers that are remotely located and communicate over a network (e.g., network 140) or a dedicated network, such as a LAN, for a merchant associated with merchant device 130.

In certain aspects, merchant device 130 may include web server software that generates, maintains, and provides web site(s) for an associated merchant that is accessible over network 140. In other aspects, merchant device 130 may connect separate to web server(s) or similar computing devices that generate, maintain, and provide web site(s) for merchant device 130. For example, a merchant associated with merchant device 130 may use web server(s) that provide a web site specific to the merchant, and allows user 101 to access, view, and purchase goods and/or services from the merchant.

Figure 2:
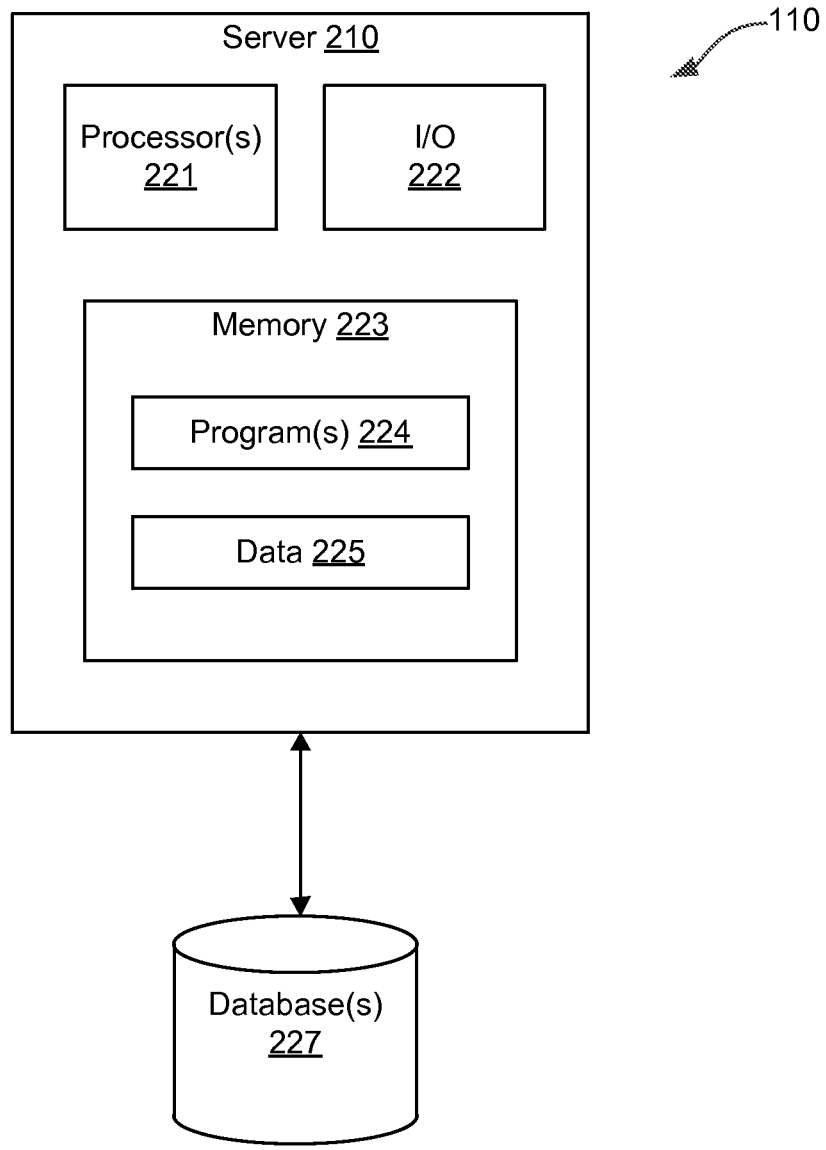
FIG. 2 is a block diagram of an exemplary server, consistent with disclosed embodiments.

FIG. 2 shows an exemplary financial service provider device 110, consistent with certain disclosed embodiments. In an exemplary embodiment, financial service provider device 110 may include a server 210. While described in association with financial service provider device 110, it should be understood that server 210 may be associated with another component of system 100, such as client device 120 and/or merchant device 130.

In one embodiment, server 210 may include one or more processors 221, one or more memories 223, and one or more input/output (I/O) devices 222. In certain embodiments, server 210 (or a system including server 210) may be configured as a particular apparatus, system, and the like based on the storage, execution, and/or implementation of the software instructions that perform one or more operations consistent with the disclosed embodiments. Server 210 may be standalone, or it may be part of a subsystem, which may be part of a larger system.

Processor 221 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 210.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor(s) 221. The disclosed embodiments are not limited to separate programs or computers configured to perform dedicated tasks. For example, memory 223 may include a single program 224 that performs the functions of the server 211, or program 224 could comprise multiple programs. Additionally, processor 221 may execute one or more programs located remotely from server 211. For example, financial service provider device 110, via server 210, may access one or more remote programs that, when executed, perform functions related to certain disclosed embodiments.

Memory 223 may also store data 225 that may reflect any type of information in any format that the system may use to perform operations consistent with the disclosed embodiments.

I/O devices 222 may be one or more device that is configured to allow data to be received and/or transmitted by server 210. I/O devices 222 may include one or more digital and/or analog communication devices that allow server 210 to communicate with other machines and devices, such as other components of systems 100.

Server 210 may also be communicatively connected to one or more database(s) 227. Server 210 may be communicatively connected to database(s) 227 through network 140. Database 227 may include one or more memory devices that store information and are accessed and/or managed through server 210. By way of example, database(s) 227 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 210 as exemplified in FIG. 2 may include database 227. Alternatively, database 227 may be located remotely from the server 210. Database 227 may include computing components (e.g., database management system, database server, etc.) configured to receive and process requests for data stored in memory devices of database(s) 227 and to provide data from database 227.

Figure 3:
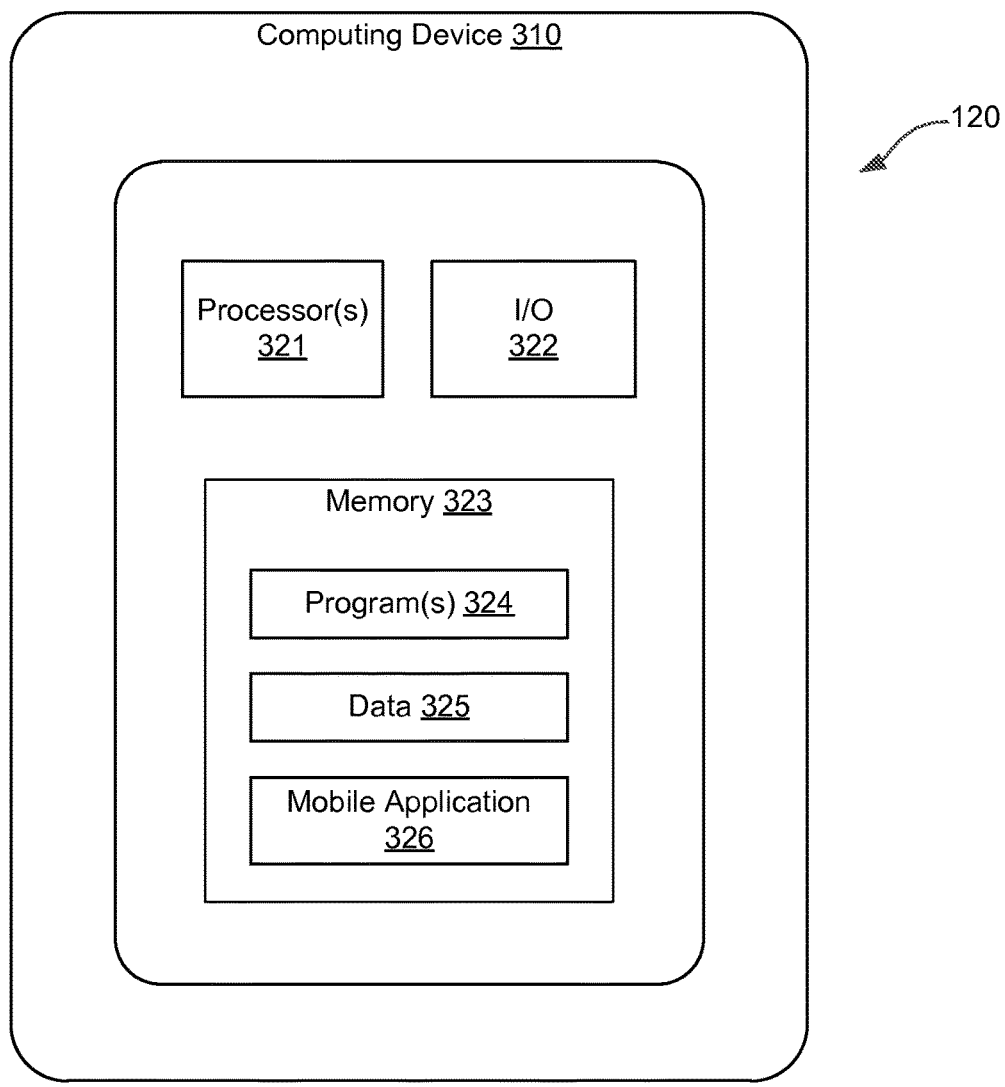
FIG. 3 is a block diagram of an exemplary computing device, consistent with disclosed embodiments.

FIG. 3 shows an exemplary client device 120 consistent with certain disclosed embodiments. In one embodiment, client device 120 may include a computing device 310. Computing device 310 may be any type of computing device such as a smartphone, table, laptop, desktop computer, server, etc. In one embodiment, computing device 310 may include one or more processors 321, one or more memories 323, and one or more input/output (I/O) devices 322.

Processor 321 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in computing device 310.

Memory 323 may include one or more storage devices configured to store instructions used by processor 321 to perform functions related to the disclosed embodiments. For example, memory 323 may be configured with one or more software instructions, such as program(s) 324 that may perform one or more operations when executed by processor 321. The disclosed embodiments are not limited to separate programs or computers configured to perform dedicated tasks. For example, memory 323 may include a single program 324 that performs the functions of computing device 310, or program 324 could comprise multiple programs. Additionally, processor(s) 321 may execute one or more programs located remotely from computing device 310. For example, computing device 310 may access one or more remote programs that, when executed, perform functions related to certain disclosed embodiments.

Memory 323 may also store data 325 that may reflect any type of information in any format that the system may use to perform operations consistent with the disclosed embodiments.

I/O devices 322 may be one or more device that is configured to allow data to be received and/or transmitted by server 311. I/O devices 322 may include one or more digital and/or analog communication devices that allow server 311 to communicate with other machines and devices, such as other components of system 100.

In certain embodiments, memory 323 may store a mobile banking application 326. Mobile banking application may be one or more programs or software instructions that, when executed by processor(s) 321, perform one or more mobile banking operations. For example, mobile banking application 326 may be a mobile application that is stored in a mobile device (e.g., computing device 310) that performs operations and generates interface(s) that are displayed on a display device of computing device 310. The interface(s) may be configured to present information and provide request(s) that elicit input from user 101. Computing device 310 may be configured with input hardware and software components that accept input from user, such as touch screen technologies, voice input, keypad entry, etc. Mobile banking application 326 may be configured to use information associated with the user 101 input to generate information, analyze and determine condition(s), generate results based on those condition(s), and provide data and interface(s) including the data. In certain aspects, mobile banking application 326 may be configured to perform one or more processes consistent with the disclosed embodiments, such as, for example, providing interfaces to allow user 101 to activate a separate interest rate for an individual transaction.

Figure 4:
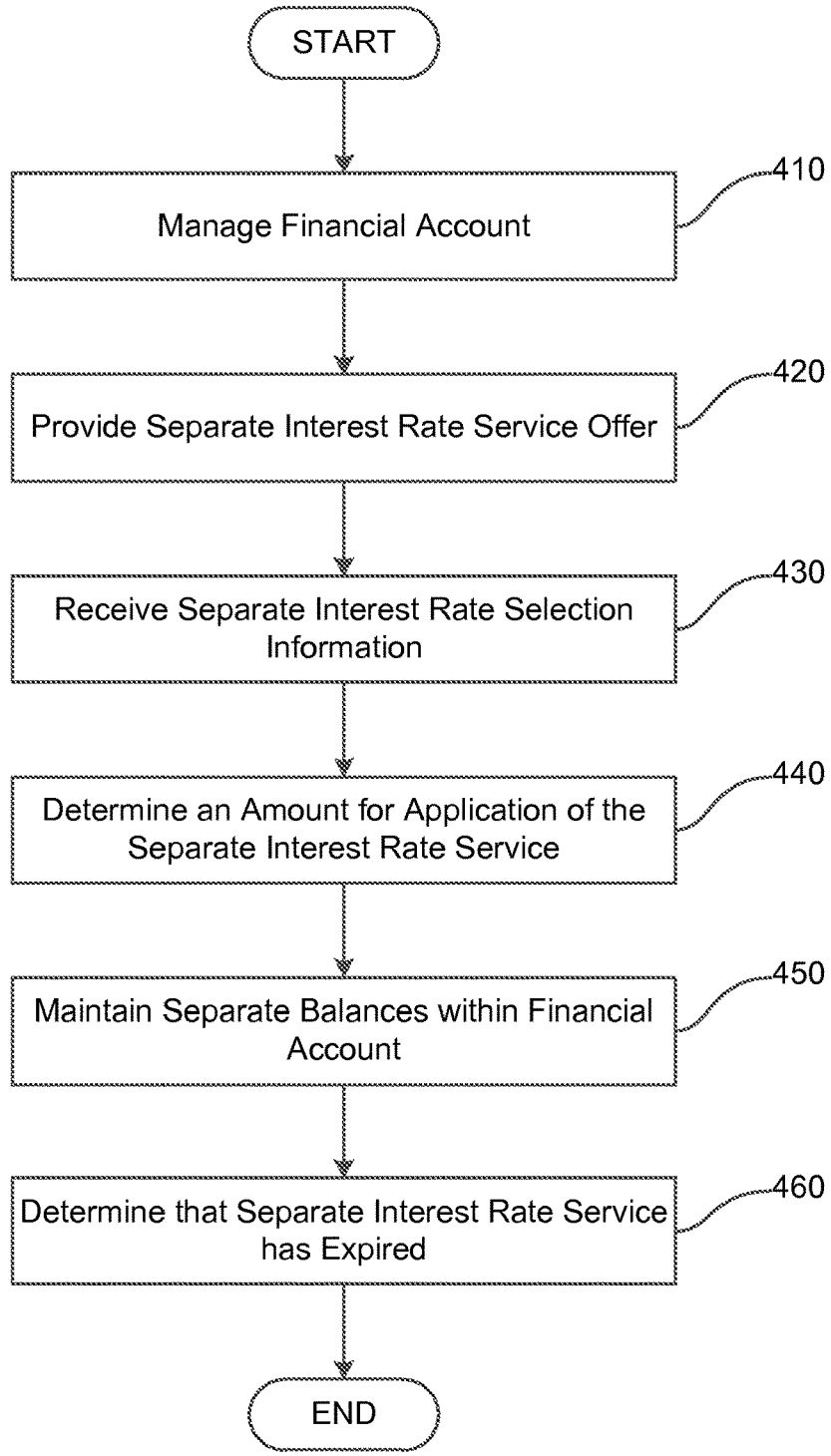
FIG. 4 is a flowchart of an exemplary financial account management process, consistent with disclosed embodiments.

FIG. 4 is a flowchart of an exemplary financial account management process 400, consistent with disclosed embodiments. In one embodiment, financial service provider device 110 may perform process 400 to manage a customer's financial account, including providing a separate account balance for an individual transaction. For example, financial service provider device 110 may execute software instructions stored in memory to perform one or more steps of process 400. It should be understood however, that one or more other computing devices (e.g., client device 120 or merchant device 130) may perform one or more steps of process 400.

Process 400 may include financial service provider device 110 managing a financial account held by a customer (step 410). For instance, financial service provider device 110 may perform one or more processes to complete transactions made by the customer using the financial account, maintain account balances, etc. In one example, the financial account may be a credit account, such as a credit card account, line of credit account, loan, etc. Financial service provider device 110 may complete purchase transactions in which the customer uses credit from the financial account to make a payment (e.g., to a merchant via merchant device 130) and repayment transactions in which the customer makes a payment into the financial account (e.g., to reduce an amount owed to the financial service provider). In other words, financial service provider device 110 may maintain an account balance associated with the financial account.

Management of the financial account may also include financial service provider device 110 (or another device) charging interest on an account balance (e.g., in accordance with terms and conditions associated with the financial account). For example, financial service provider device 110 may periodically (e.g., daily, weekly, monthly, etc.) calculate an interest amount based on a state of the financial account, including an account balance at the time and an applicable interest rate for the financial account. In calculating interest, financial service provider device 110 may consider a variety of factors, including whether the financial account qualifies for a grace period in which no interest should be charged (e.g., when the account balance includes only purchases made during the most recent billing cycle). Financial service provider device 110 may add the interest amount to the account balance.

Management of the financial account may also include financial service provider device 110 (or another device) providing financial account information to client device 120. For example, financial service provider device 110 may transmit information including an account balance, completed transactions, pending transactions, interest charged, recent payment information, minimum payment due, payment due date, etc. Client device 120 may receive and display the information, such as through performance of one or more processes associated with a mobile banking application, a banking website, etc. Financial service provider device 110 may receive information (e.g., from client device 120) including instructions for making payments, transferring balances, requests for additional information and/or customer service, etc.

In some embodiments, financial service provider device 110 may provide an offer for a separate interest rate service (step 420). For example, financial service provider device 110 may transmit an offer to client device 110. The separate interest rate service may include the application of a separate interest rate (e.g., different than the normal interest rate associated with the financial account) to at least a portion of an account balance (e.g., an amount associated with a selected individual transaction), as will be described herein in more detail.

In some embodiments, financial service provider device 110 may determine that a customer is eligible for a separate interest rate service offer. The manner in which a customer may become eligible for a service offer is not limited. In one example, a new customer that opens a new financial account may be eligible for one or more separate interest rate service offers. In another example, a customer may become eligible for an offer as part of a customer service procedure (e.g., provide offers to customers in good standing with the financial service provider, customer's whose promotional rates are set to expire, etc.). In yet another example, a customer may become eligible based on eligibility criteria set by the financial service provider and/or customer. Eligibility criteria may include, for example, one or more of making a certain number of payments on time, spending a certain amount of money, making a certain number of purchases using a financial account, enrolling in digital servicing/paperless statements, etc.

In an exemplary embodiment, financial service provider device 110 may also determine one or more terms and/or conditions of the separate interest rate service offer. The terms and/or conditions of the service offer may indicate how the offer can be redeemed, how the service would be provided, restrictions and/or limitations on its use, and the like. For example, financial service provider device 110 may determine a separate interest rate, a period of time that the separate interest rate is applicable, any applicable fee, and criteria for a transaction to be eligible for the separate interest rate service. In one example, financial service provider device 110 may determine that a customer is eligible for a 0% interest rate for six months with no fee, applicable to any one future purchase within a set price range. In another example, financial service provider device 110 may determine that a customer is eligible for a 3% interest rate for 12 months with a 1% fee, applicable to any purchases made at qualifying merchants (e.g., restaurants, retail stores, etc.). It should be understood, however, that the terms of the service offer are not limited and may be any terms that may be applied to apply a separate interest rate to at least a portion of an account balance.

In certain aspects, separate interest rate service offers may be associated with different criteria for activation. In one example, a separate interest rate service offer may be activated by customer selection. For instance, a customer may select a transaction (e.g., a previously-completed transaction, a specific future transaction (e.g., the next transaction), a future transaction that meets certain criteria, etc.) for application of a separate interest rate thereto. In another example, a separate interest rate service offer may be activated automatically, such as by financial service provider device 110. For instance, a service offer may be automatically applicable to one or more transactions that satisfy certain criteria (e.g., a transaction at a particular merchant, at a particular location, during a particular time period, etc.). Financial service provider device 110 may determine activation information associated with a separate interest rate service offer, such that the information may be provided to a customer.

In an exemplary embodiment, financial service provider device 110 may provide a separate interest rate service offer to client device 120 (e.g., via network 140). For example, financial service provider device 110 may transmit a notification, such as via text messaging, push notifications, e-mail, mobile application, website, etc., to client device 120, the notification identifying a service offer that is available to a customer associated with client device 120 (e.g., user 101).

The offer may include service offer information, including, for example, terms and conditions of the offer (e.g., separate interest rate, duration separate interest rate is applicable, any associated fees, period of time during which service offer is valid, etc.). In one embodiment, the service offer information may also include activation information (e.g., whether action by the customer is required, what action is necessary, how a service offer will be automatically activated, etc.).

In some embodiments, financial service provider device 110 may provide a separate interest rate service offer based on information about client device 120 or an associated customer. In one example, financial service provider device 110 may provide an offer when client device 120 is in a particular location (e.g., based on location information sent from client device 120 to financial service provider device 110). For instance, financial service provider device 110 may determine that client device 120 is at a particular merchant location and provide an offer to client device 120 that the customer may be interested in using at that merchant location.

In another example, financial service provider device 110 may provide an offer to client device 120 when it is determined that an associated customer is in the process of or has completed a transaction. For example, financial service provider device 110 may receive information indicating that the customer is completing or has completed a purchase transaction and may provide an offer to client device 120 with the option of using the offer for the transaction such that a separate interest rate is applied to that transaction.

Client device 120 may receive a notification and provide a service offer to the customer (e.g., display information via an interface). In this way a customer may be made aware of a separate interest rate service offer and choose whether to take steps to activate the service offer. It should be understood, however, that a service offer may be automatically activated, without input from a customer and/or without the customer being made aware of the availability of a service offer (through a notification from financial service provider device 110 or otherwise).

Financial service provider device 110 may also receive separate interest rate selection information (step 430). The separate interest rate selection information may be information indicating that financial service provider device 110 should provide a separate interest rate service. In one embodiment, separate interest rate selection information may include a notification (e.g., from client device 120) indicating that a service offer has been accepted. In an exemplary embodiment, the separate interest rate selection information may also include information identifying a selected transaction to which the separate interest rate will be applied.

In one example, the separate interest rate selection information may include information identifying a customer-selected transaction for application of the separate interest rate. In another example, the separate interest rate selection information may include information identifying a transaction that satisfies criteria for automatic activation of a separate interest rate service. For instance, financial service provider device 110 may receive information associated with a completed transaction (e.g., a purchase transaction at a merchant associated with merchant device 130). Financial service provider device 110 may compare the information associated with a completed transaction to automatic offer activation criteria to determine whether a separate interest rate service should be activated and applied to the completed transaction. For example, financial service provider device 110 may receive information associated with a completed transaction with a particular merchant. Financial service provider device 110 may match the identity of the particular merchant with automatic offer activation criteria that indicates that a purchase at that merchant should automatically activate a separate interest rate service applicable to that transaction.

Financial service provider device 110 may determine an amount for application of the separate interest rate service (step 440). For example, financial service provider device 110 may determine an amount based on received separate interest rate selection information. In one example, financial service provider device 110 may receive information associated with a customer-selected transaction or a transaction that automatically activates a separate interest rate service. Based on the information, financial service provider device 110 may determine an amount associated with a transaction. For example, the amount may be included with the received information and/or determined by financial service provider device 110 based on stored information.

Financial service provider device 110 may thereafter maintain separate balances within the one financial account (step 450). For example, financial service provider device 110 may use the amount determined in step 440 and an account balance to create two separate account balances for the purposes of applying interest charges. A first account balance may include the balance of the account for which the default interest rate will be applied, while the second account balance may include the amount receiving a different interest rate (e.g., more favorable to the customer). In this way, an amount of a selected transaction may be separated from the rest of the financial account for the purposes of applying a separate interest rate.

In maintaining the first and second account balances, financial service provider device 110 may apply a first interest rate to the first account balance and apply a second interest rate to the second account balance. In one example, the first interest rate may be the standard interest rate associated with the financial account, while the second interest rate may be the separate interest rate that was determined as part of the separate interest rate service offer. In an exemplary embodiment, the second interest rate is more favorable from the customer's perspective (e.g., a lower rate than the first interest rate for a credit account). In this way, a calculated interest amount will be less than it would otherwise be if the first interest rate were applied to a total account balance.

Financial service provider device 110 may apply the first and second interest rates to the first and second account balances to calculate an interest amount to be charged to the customer. For example, financial service provider device 110 may calculate a first interest amount based on the first account balance and the first interest rate and calculate a second interest amount based on the second account balance and the second interest rate. It should be understood however, that if the second interest rate is 0%, financial service provider device 110 may apply the second interest rate to the second account balance without performing any calculations (e.g., by not charging interest associated with the second account balance).

Financial service provider device 110 may periodically calculate first and second interest amounts and add them to the first and/or second account balances. For example, financial service provider device may add the first interest amount to the first account balance and add the second interest amount to the second account balance, add the first and second interest amounts to the first account balance, or other process for charging interest.

Financial service provider device 110 may further maintain the separate balances by applying one or more payments to lower one or more of the first and second balances. For example, a customer may make a payment applied to the financial account that does not cover both the full balance of the account. Financial service provider device 110 may allocate the payment such that the first balance becomes completely paid while any remainder of the payment is applied to the second balance, and financial service provider device 110 may update the first and second balances accordingly.

Financial service provider device 110 may similarly update the first and second account balances based on subsequently-completed transactions. For example, financial service provider device 110 may add an amount associated with a subsequently-completed transaction to the first account balance, unless the transaction is also associated with a separate account balance offer, in which the amount of the transaction is added to the second account balance (or third, fourth, etc. account balance, as the case may be) for application of the separate interest rate(s).

In an exemplary embodiment, financial service provider device 110 may be configured such that, in maintaining separate balances, one balance will not have an effect on a benefit that may be otherwise obtained if the balance did not exist. For example, a customer may receive a grace period benefit associated with payments on the first account balance, even if a balance is carried as the second account balance. For example, as is typical for a standard credit card account, a grace period benefit prevents interest from being charged on transactions within a most-recent billing period, as long as the account was paid in full during the previous billing period. In an exemplary embodiment, financial service provider device 110 may provide a grace period benefit (e.g., not charge interest on the first account balance), as long as the first account balance remains eligible (e.g., payments cover all transactions that were made during the most recent billing cycle and added to the first account balance).

In some embodiments, additional or alternative benefits may be associated with the second account balance. In one embodiment, financial service provider device 110 may provide a credit limit benefit in which the second account balance is exempted from a determination of available credit. For example, an amount associated with the second account balance may not count against the overall account's credit line (e.g., only purchases associated with the first account balance count for determination of available credit remaining). In this way, a customer may use a separate interest rate service for a purchase that they would otherwise not be able to make due to their credit limit.

In some embodiments, financial service provider device 110 may determine that a separate interest rate service has expired (step 460). For example, if a second account balance becomes paid in full, financial service provider device 110 may cease maintaining separate account balances. In another example, a separate interest rate service may expire at an end of a period of time associated with the service. For instance, if a separate interest rate service extended six months, the service would expire if the second account balance were not paid in full at the end of the six months. At that time, financial service provider device may add the remaining second account balance to the first account balance and subsequently charge interest on the single account balance by applying the first interest rate (e.g., the standard interest rate associated with the financial account). In some embodiments, financial service provider device 110 may send a reminder to client device 120 to inform the customer that the separate interest rate service will expire.

Figure 5:
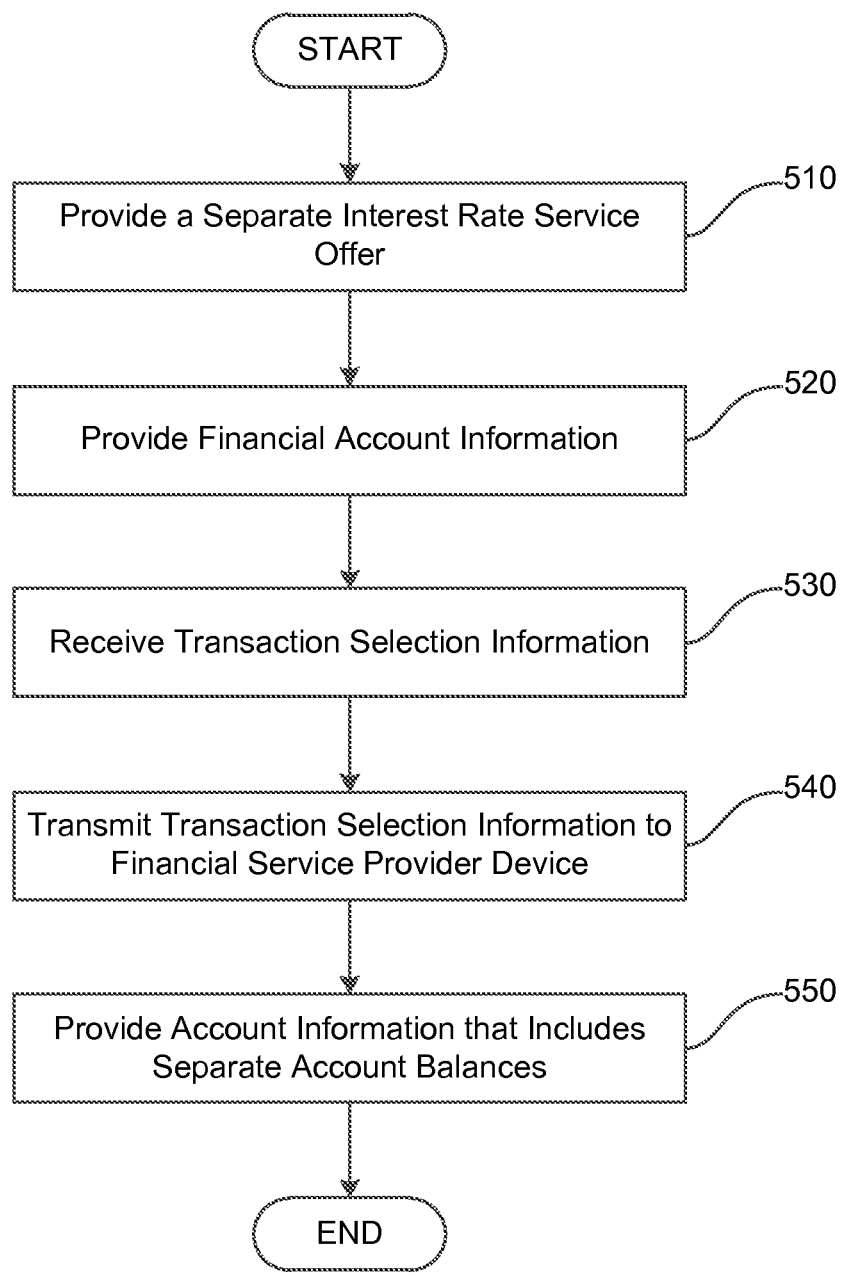
FIG. 5 is a flowchart of an exemplary offer activation process, consistent with disclosed embodiments.

FIG. 5 is a flowchart of an exemplary service activation process 500, consistent with disclosed embodiments. In one embodiment, client device 120 may perform process 500 to activate and/or accept a separate interest rate service offer. For example, client device 120 may execute software instructions stored in memory to perform one or more steps of process 500. It should be understood, however, that one or more other computing devices (e.g., financial service provider device 110 or merchant device 130) may perform one or more steps of process 500.

In an exemplary embodiment, client device 120 may receive a separate interest rate service offer (step 510) from, for example, financial service provider device 110. In one example, client device 120 may receive a separate interest rate service offer from financial service provider device 110 and display the received information via an associated user interface. For example, client device 120 may display terms and conditions of the service offer (e.g., the separate interest rate, duration the separate interest rate and to which purchases it will apply, any fees, etc.) and/or activation information (e.g., information indicating how the service offer can be activated such as, for example, the customer-selecting of a transaction for the separate interest rate and/or automatic offer activation criteria). Client device 120 may receive the separate interest rate offer in any manner, such as by text messaging, push notifications, email, etc.

Client device 120 may also perform one or more steps to activate the separate interest rate service. In one example where a separate interest rate is applied to a customer-selected transaction, client device 120 may display or otherwise provide financial account information (step 520). For example, client device 120 may display a list of previously-completed financial transactions associated with a financial account. In one embodiment, client device 120 (or financial service provider device 110) may determine which of a plurality transactions associated with a financial account are eligible for a separate interest rate service and client device 120 may display those transactions.

Client device 120 may thereafter receive transaction selection information (step 530). For example, client device 120 may receive a selection from the plurality of displayed transactions. Client device 120 may receive the selection from a customer (e.g., user 101) via an associated user interface.

Client device 120 may transmit transaction selection information to financial service provider device 110 (step 540). The transaction selection information may identify the transaction the customer has selected to have a separate interest rate offer applied thereto. The transaction selection information may include an amount of the transaction, which may be the amount financial service provider device 110 determines as the amount to be placed in a separate account balance. Financial service provider device 110 may subsequently maintain separate account balances, as described herein.

In an exemplary embodiment, client device 120 may provide account information that includes the separate account balances (step 550). For example, as financial service provider device 110 maintains the separate account balances, financial service provider device 110 may send account information to client device 120, which client device 120 may display. The account information may include up-to-date account balances associated with the separate balances, interest charged, duration of separate interest rate, expiration of separate interest rate, payment information, etc. In this way, client device 120 may provide financial account information associated with separated balances to inform a customer about the state of their financial account, including the state of an activated separate interest rate service.

Figure 6:
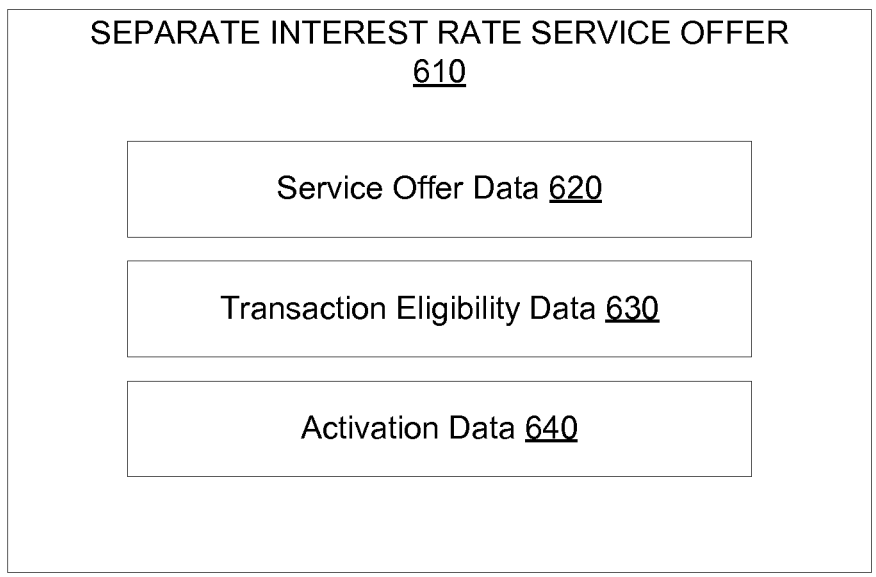
FIG. 6 is an exemplary data structure associated with an exemplary separate interest rate service offer, consistent with disclosed embodiments.

FIG. 6 is a block diagram of an exemplary data structure associated with an exemplary separate interest rate service offer 610, consistent with disclosed embodiments. In one embodiment, financial service provider device 110 may store offer 610 in a memory device and/or provide offer 610 to client device 120.

Financial service provider device 110 and/or client device 120 may generate and store data in association with offer 610, the data including information that defines offer 610. For example, offer 610 may include service offer data 620, transaction eligibility data 630, and/or activation data 640. It should be understood that, however, that alternative and/or additional types of data may be stored as part of offer 610. Financial service provider device 110 and/or client device 110 may perform one or more processes based on the data stored in association with offer 610.

In an exemplary embodiment, service offer data 620 may include information that includes the terms of the separate interest rate service offer. For example, service offer data 620 may include the separate interest rate to be applied (e.g., 0%), the period of time that the separate interest rate will apply (e.g., six months), and any fees associated with the offer. Financial service provider device 110 may receive and store service offer data 620 and provide service offer data 620 to client device 120 for display to inform the customer of the parameters of the service being offered.

In an exemplary embodiment, transaction eligibility data 630 may include information that sets forth the criteria for a transaction to be eligible for offer 610. For example, transaction eligibility data 630 may include data indicating that any previously-completed transaction made using a particular financial account is eligible. In another example, transaction eligibility data 630 may include criteria for a transaction to be eligible, such as a list of eligible merchants, transaction amounts, time periods during which the transaction occurred, etc. In some embodiments, financial service provider device 110 and/or client device 120 may compare transaction eligibility data 630 to information associated with a transaction to determine whether a transaction is eligible.

In an exemplary embodiment, activation data 640 may include information that defines how offer 610 is activated. For example, activation data 640 may include data that indicates that offer 610 is activated based on customer selection of a transaction. In another example, activation data 640 may include data that indicates that offer 610 is automatically activated when an eligible transaction is completed. Financial service provider device 110 may determine that an eligible transaction was completed based on information associated with a completed transaction and transaction eligibility data 630, for instance.

FIG. 7A is another block diagram of an exemplary data structure associated with a financial account 710 before a separate interest rate service offer (e.g., offer 610) is activated, consistent with disclosed embodiments. In one embodiment, financial service provider device 110 may store financial account 710 in a memory device and perform one or more processes to maintain financial account 710.

In an exemplary embodiment, financial account 710 may include an account record 720. Account record 720 may include data associated with management of financial account 710, including debits and credits associated with financial account 710 (e.g., payments made using financial account 710, payments into financial account 710, and interest charges associated with financial account 710). For example, account record 720 may include transactions 730, an interest rate 740, and an account balance 750.

In an exemplary embodiment, transactions 730 may include transactions 730A, 730B, and 730C. Each transaction 730A, 730B, and 730C may be an individual transaction that was completed with financial account 710. For example, transaction 730A may be a purchase transaction completed with a merchant associated with merchant device 130. Transaction 730A may include data that defines the purchase transaction, such as merchant data 732, purchase data 734, and/or time/date/location data 736. Merchant data 732 may include information that identifies a merchant associated with merchant device 130 with which the transaction was completed. Purchase data 734 may include, for example, an amount of the transaction, items purchase, individual cost of items purchased, etc. Time/date/location data 736 may include information that identifies when and where the purchase transaction occurred. While not shown, transactions 730B and/or 730C may include similar information associated with the underlying transactions respectively associated with transactions 730B and 730C.

Interest rate 740 may be an interest rate associated with financial account 710 and financial record 720. For example, interest rate 740 may be a standard interest rate that is applied to all transactions (prior to activation of a separate interest rate offer) for which interest is to be applied. Interest rate 740 may be fixed or variable, depending on terms and conditions associated with financial account 710.

Account balance 750 may include data that identifies an up-to-date balance associated with financial account 710. For example, as transactions are completed and added to financial record 720, financial service provider device 110 may perform one or more processes to determine account balance 750. This may include financial service provider device 110 adding to account balance 750 any transactions made using financial account 710 and any periodic interest associated with financial record 720 and subtracting any transactions that include payments into financial account 710.

FIG. 7B is another exemplary data structure associated with financial account 710 after a separate interest rate service offer is activated, consistent with disclosed embodiments. As described herein, a separate interest rate service offer may be activated in a variety of manners, some of which are further described below.

In one example, financial service provider device 110 may activate a separate interest rate service offer based on a customer selection. For instance, financial service provider device 110 may provide offer 610 to client device 120. Client device 120 may display information associated with offer 610 to allow a customer to choose whether to accept offer 610. For example, client device 120 may display a list of transactions that are eligible for offer 610. Financial service provider device 110 and/or client device 120 may determine the list of transactions based on information associated with the transactions (e.g., data 732, 734, 736) and information associated with eligibility of transactions (e.g., transaction eligibility data 630). Client device 120 may display eligible transactions, receive a selection, and transmit the selection to financial service provider device 110. Financial service provider device 110 may activate offer 610 based on receipt of the selection and activation data 640. In some embodiments, client device 120 may display only one transaction and request that the customer choose whether to accept or decline offer 610 in associated with that transaction.

In another example, financial service provider device 110 may activate a separate interest rate service offer automatically. For instance, after a transaction is completed, financial service provider device may compare transaction information (e.g., data 732, 734, 736) to transaction eligibility data 630 to determine if a transaction is eligible. If a transaction is eligible, financial service provider device 110 may check activation data 740 to determine if offer 610 should be automatically activated for eligible transactions. If so, financial service provider device 110 may automatically activate offer 610 for the selected transaction. In one example, a merchant associated with merchant device 130 and a financial service provider associated with financial service provider device 110 may have an agreement that allows automatic activation of a separate interest rate service for transactions made with that merchant. Financial service provider device 110 may match merchant data included with transaction information to merchant data included with transaction eligibility data 630 to find these transactions and activate offer 610.

In one embodiment, financial service provider device 110 may continue to maintain financial account 710 after the separate interest rate service offer is activated to maintain separate account balances associated with the separate interest rates. In the embodiment shown in FIG. 7B, a separate interest rate service offer was accepted to apply a separate interest rate to transaction 730B.

In one embodiment, after a separate interest rate service offer is activated, financial service provider device 110 may generate a separate financial record 760. Separate financial record 760 may include information that allows a separate interest rate to be applied based on activation of the offer. For example, separate financial record 760 may include information associated with one or more transactions 730 that were selected for application of the separate interest rate (e.g., in this case transaction 730B). The information may include an amount of the transaction. In addition, separate financial record 760 may include the separate interest rate 770 and separate account balance 780.

Separate interest rate 770 may be the separate interest rate that is associated with the separate interest rate service offer that was accepted. For example, separate interest rate 770 may be an interest rate found in service offer data 620 of offer 610 (e.g., 0%). Separate account balance 780 may be an account balance associated only with financial record 760. For example, separate account balance 780 may initially include an amount associated with transaction 730B. Financial service provider device 110 may update separate account balance 780 over time based on additional transactions (e.g., additional transactions that are associated with service offers, interest charges, customer payments, etc.).

As described above, when a separate interest rate service offer is accepted and activated, financial service provider device 110 may maintain separate account balances 750, 780 associated with separate interest rates 740, 770 within a single financial account 710. In this way, financial service provider device 110 (or another device) may apply a separate interest rate to an individual transaction (e.g., transaction 730B) made using a financial account (e.g., financial account 710) that otherwise has an interest rate associated therewith. In an exemplary embodiment, financial service provider 110 device may be further configured to recombine separate account balances 750, 780, such as after a period of time associated with the separate interest rate service offer expires.

The disclosed embodiments enable a customer to use a financial account and receive a separate, lower interest rate on individual transactions. This obviates the need for the customer to perform another task (e.g., open a new account, transfer an account balance, etc.) to obtain a promotional benefit. Further, disclosed systems and methods allow a financial service provider to provide and maintain separate balances within one financial account, while not affecting benefits (e.g., grace period benefits) that the customer would otherwise receive. The disclosed embodiments allow a customer to use a single financial account for different purchases, such as everyday purchases and large purchases, thereby simplifying management of the customer's finances.

The exemplary disclosed embodiments describe systems and methods for providing a separate interest rate to an individual transaction. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented in hardware alone.

Furthermore, although the above description primarily refers to a financial service provider making determinations regarding the secondary benefits of its customers, one of skill in the art would appreciate that disclosed embodiments are not limited to the financial industry and may be employed in other fields.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for providing a service associated with an account having an account balance and an associated first interest rate, comprising:
   one or more memory devices storing instructions; and
   one or more processors configured to execute the instructions to perform operations comprising:
      receiving information indicating that a user is in a process of completing an online transaction occurring at a client device associated with the user;
      determining whether the online transaction meets automatic offer activation criteria for providing a separate interest rate service offer;
      based on a result of the determination that the online transaction meets the automatic offer activation criteria:
         providing to the client device a notification for display in a user interface in the client device, the notification identifying the separate interest rate service offer available for application to the online transaction; and
         providing to the client device a list of previously-completed transactions for display in the user interface;
      receiving a separate interest rate selection from the client device, the separate interest rate selection comprising:
         an indication of an acceptance by the user to apply the separate interest rate service offer to the online transaction, and
         a selection of a first one of the previously-completed transactions to apply the separate interest rate service offer in response to user input via the user interface;
      determining, by the one or more processors, a selected portion of the account balance corresponding to an amount to which a second interest rate, different from the associated first interest rate, is to be applied based on the separate interest rate selection; and
      generating a first data structure for the selected portion of account balance and a second data structure for the remainder of the account balance, the first data structure being different from the second data structure.

2. The system of claim 1, wherein determining the selected portion of the account balance comprises determining an amount of the first previously-completed transaction.

3. The system of claim 1, wherein
   the operations further comprise:
      determining that transaction information relating to a second of the previously-completed transactions satisfies the automatic offer activation criteria.

4. The system of claim 3, wherein the automatic offer activation criteria includes a merchant at which transactions automatically qualify for the separate interest rate service.

5. The system of claim 1, wherein providing the notification identifying the separate interest rate service offer comprises providing terms associated with the separate interest rate service offer.

6. The system of claim 5, wherein the terms comprise identification of the second interest rate and a period of time that the second interest rate would apply.

7. The system of claim 5, wherein the terms comprise criteria for a transaction to be eligible for the separate interest rate service.

8. The system of claim 1, wherein:
   a remainder portion of the account balance is a first account balance and the selected portion is a second account balance, and
   the operations further comprise:
      applying the associated first interest rate to the first account balance; and
      applying the second interest rate to the second account balance.

9. The system of claim 8, wherein the operations further comprise providing a grace period benefit based on a state of the first account balance.

10. The system of claim 8, wherein the second interest rate is 0%.

11. The system of claim 8, wherein the operations further comprise exempting the second account balance from a determination of available credit associated with the account.

12. A computer-implemented method for providing a service associated with an account having an account balance and an associated first interest rate, comprising:
   receiving, at a service device, information indicating that a user is in a process of completing an online transaction occurring at a client device;
   determining whether the online transaction meets automatic offer activation criteria for providing a separate interest rate service offer;
   based on a result of the determination that the online transaction meets the automatic offer activation criteria:
      providing to the client device a notification for display in a user interface in the client device, the notification identifying the separate interest rate service offer available for application to the online transaction; and providing to the client device a list of previously-completed transactions for display in the user interface in the client device;

receiving a separate interest rate selection from the client device, the separate interest rate selection comprising:
an indication of an acceptance by the user to apply the separate interest rate service offer to the online transaction, and
a selection of one of the previously-completed transactions to apply the separate interest rate service offer in response to user input via the user interface;

providing, from the service device, the separate interest rate service offer to a client device;

receiving, at the service device, the online transaction from the client device;

determining, by the service device, a selected portion of the account balance based on an amount of the online transaction and an amount of the selected previously-completed transaction, wherein a remainder portion of the account balance is a first balance and the selected portion is a second balance;

applying the associated first interest rate to the first balance;

applying a second interest rate to the second balance; and generating a first data structure for the first balance and a second data structure for the second balance, the first data structure being different from the second data structure.

13. The computer-implemented method of claim 12, further comprising determining that a customer is eligible for the separate interest rate service offer.

14. The computer-implemented method of claim 12, further comprising providing a grace period benefit based on a state of the first balance.

15. The computer-implemented method of claim 12, wherein the second interest rate is 0%.

16. A computing device for configuring a financial account having an account balance and an associated first interest rate, comprising:
one or more memory devices storing software instructions;
a user interface; and
one or more processors configured to execute the software instructions to perform operations comprising:
detecting that a user is in a process of completing an online transaction occurring at the computing device;
transmitting, to a service device, information relating to the detection;
receiving, from the service device, a notification for display in the user interface in response to a determination by the service device that the online transaction meets automatic offer activation criteria for providing a separate interest rate service offer, the notification identifying the separate interest rate service offer available for application to the online transaction;
providing, by the user interface, the notification and a list of previously-completed transactions;
receiving, by the user interface, input by the user indicating:
an acceptance by the user to apply the separate interest rate service offer to the online transaction, and
a selection of one of the previously-completed transactions to apply the separate interest rate service offer;
generating, based on the input by the user, a separate interest rate selection, the separate interest rate selection comprising the indication of the acceptance by the user to apply the separate interest rate service offer to the online transaction;
transmitting, to the service device, the separate interest rate selection to the service device, wherein the separate interest rate selection indicates an amount to which a second interest rate, different from the associated first interest rate, is to be applied by the service device; and
receiving, from the service device, account information associated with a first balance to which the first interest rate is to be applied by the service device, the account information associated with the first account balance is determined based on a first data structure stored in the service device; and
receiving, from the service device, account information associated with a second balance to which the second interest rate is to be applied by the service device, the account information associated with the second balance is determined based on a second data structure stored in the service device, the first data structure being different from the second data structure.

17. The computing device of claim 16, wherein the operations further comprise providing, by the user interface, information associated with the separate interest rate service offer.

18. The computing device of claim 17, wherein the information associated with the separate interest rate service offer includes: the second interest rate, a period of time that the second interest rate would apply, and criteria for a transaction to be eligible for the separate interest rate service.

19. The computing device of claim 17, wherein the information associated with the separate interest rate service offer includes activation information that indicates how to activate the separate interest rate service.

* * * * *